United States Patent
Shin et al.

(10) Patent No.: US 9,305,712 B2
(45) Date of Patent: Apr. 5, 2016

(54) TANTALUM CAPACITOR AND METHOD OF MANUFACTURING THE SAME

(71) Applicant: SAMSUNG ELECTRO-MECHANICS CO., LTD., Suwon, Gyunggi-do (KR)

(72) Inventors: Hong Kyu Shin, Gyunggi-do (KR); Jae Bum Cho, Gyunggi-do (KR); Wan Suk Yang, Gyunggi-do (KR); Hyun Sub Oh, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 183 days.

(21) Appl. No.: 14/097,872

(22) Filed: Dec. 5, 2013

(65) Prior Publication Data

US 2015/0036265 A1 Feb. 5, 2015

(30) Foreign Application Priority Data

Aug. 5, 2013 (KR) .......................... 10-2013-0092448

(51) Int. Cl.
*H01G 9/15* (2006.01)
*H01G 9/012* (2006.01)
*H01G 9/10* (2006.01)

(52) U.S. Cl.
CPC .................. *H01G 9/15* (2013.01); *H01G 9/012* (2013.01); *H01G 9/10* (2013.01); *Y10T 29/417* (2015.01)

(58) Field of Classification Search
CPC ............ H01G 9/012; H01G 9/10; H01G 9/15
USPC .................. 361/529, 516–519, 523–525, 530, 361/534–535, 538, 540
See application file for complete search history.

(56) References Cited

U.S. PATENT DOCUMENTS

| 6,236,561 | B1 * | 5/2001 | Ogino et al. .................. 361/523 |
| 8,351,187 | B2 * | 1/2013 | Kim et al. ..................... 361/538 |
| 2008/0080124 | A1 * | 4/2008 | Kim et al. ..................... 361/529 |

FOREIGN PATENT DOCUMENTS

KR 20020074339 A 9/2002

* cited by examiner

*Primary Examiner* — Nguyen T Ha
(74) *Attorney, Agent, or Firm* — McDermott Will & Emery LLP

(57) ABSTRACT

There is provided a tantalum capacitor, including: a capacitor body including a tantalum powder and having a tantalum wire, a molding part formed to expose an end portion of the tantalum wire and enclose the capacitor body, an anode lead frame including an anode mounting part and an anode terminal part, the anode terminal part being connected to the tantalum wire, a thin plate electrode formed on a lower surface of the capacitor body and exposed through the other end surface of the molding part, and a cathode lead frame including a cathode mounting part and a cathode terminal part, the cathode terminal part being connected to the thin plate electrode.

11 Claims, 2 Drawing Sheets

A − A'

TANTALUM CAPACITOR AND METHOD OF MANUFACTURING THE SAME

CROSS-REFERENCE TO RELATED APPLICATION

This application claims the benefit of Korean Patent Application No. 10-2013-0092448 filed on Aug. 5, 2013, with the Korean Intellectual Property Office, the disclosure of which is incorporated herein by reference.

BACKGROUND

The present disclosure relates to a tantalum capacitor and a method of manufacturing the same.

Tantalum (Ta) materials are metals widely used throughout industries such as electrical, electronic, mechanical, chemical engineering, space, military fields, and the like due to mechanical and physical characteristics such as high melting points, and excellent softness and corrosion resistance, and the like.

The above-mentioned Ta materials have been widely used as anode materials of small capacitors due to characteristics capable of forming stable anodized films and annual usages thereof have rapidly increased in accordance with rapid developments of information technology (IT) industries such as electronic and information communications in recent years.

Capacitors are electric condensers temporarily storing electricity, are parts in which two plate electrodes insulated from each other are adjacent and dielectric layers are inserted between both poles to allow charges to accumulate using attractive force, and are used to obtain capacitance by enclosing the charge and electric field in a space surrounded by two conductors.

A tantalum capacitor using the tantalum material having a structure using a gap generated when tantalum powder is sintered and hardened is completed by forming tantalum oxide ($Ta_2O_5$) on a tantalum surface using an anodic oxidation method, forming a manganese dioxide ($MnO_2$) layer, which is electrolytic, on the tantalum oxide by using the tantalum oxide as a dielectric, forming a carbon layer and a metal layer on the manganese dioxide layer to thereby form a body, and forming an anode and a cathode, and a molding part on the body in order to mount the body on a printed circuit board (PCB).

The tantalum capacitor according to the related art uses a structure in which terminals are exposed to the outside without having an inner lead frame or a frame in order to connect the tantalum material and the electrode.

In this case, in the case of the structure using the inner lead frame, a space occupied by the tantalum material in the molding part may be decreased by the lead frame containing the anode and the cathode. Since capacitance is proportional to a volume of the tantalum material, the capacitance may be limited. In the case of a structure in which the terminal is exposed to the outside without having the frame, a plurality of contact materials are present, such that contact resistance maybe increased by the plurality of contact materials, thereby increasing equivalent series resistance (ESR) of the capacitor.

In addition, in the case of the structure in which the terminal is exposed to the outside without having a frame according to the related art, a cathode lead frame is positioned on a side of a product, and therefore, a welding work distance at which work for formation of a solder can be carried out between the tantalum material and the cathode lead frame needs to be secured, such that inner capacity of tantalum material is decreased, thereby decreasing capacitance.

The following Related Art Document relates to a condenser including a tantalum element, but does not disclose a configuration in which a thin plate electrode connected to a tantalum material is exposed to an end surface of a molding part to thereby be connected to a cathode lead frame formed on one surface of the molding part.

RELATED ART DOCUMENT

Korean Patent Laid-open Publication No. 2002-0074339

SUMMARY

An aspect of the present disclosure may provide a tantalum capacitor capable of implementing low equivalent series resistance (ESR) and improving capacitance.

According to an aspect of the present disclosure, a tantalum capacitor may include: a capacitor body including a tantalum powder and having a tantalum wire; a molding part formed to expose an end portion of the tantalum wire and enclose the capacitor body; an anode lead frame including an anode mounting part formed on a lower surface of the molding part and an anode terminal part formed to be extended from the anode mounting part to one end surface of the molding part, the anode terminal part being connected to the tantalum wire; a thin plate electrode formed on a lower surface of the capacitor body and exposed through the other end surface of the molding part; and a cathode lead frame including a cathode mounting part formed on the lower surface of the molding part so as to be spaced apart from the anode mounting part and a cathode terminal part formed to be extended from the cathode mounting part to the other end surface of the molding part, the cathode terminal part being connected to the thin plate electrode.

The tantalum capacitor may further include an insulation layer formed between the molding part and the anode mounting part and between the thin plate electrode and the cathode mounting part.

The insulation layer may have a thickness of 40 μm or less.

The anode lead frame may have a protrusion part formed to be protruded from the anode terminal part to an inner side of the molding part so that a groove part to which one end portion of the insulation layer is insertedly coupled is provided.

The tantalum capacitor may further include a conductive adhesive layer formed between the lower surface of the capacitor body and the thin plate electrode.

The conductive adhesive layer may include an epoxy-based thermosetting resin and a conductive metal powder.

According to another aspect of the present disclosure, a method of manufacturing a tantalum capacitor may include: preparing anode and cathode lead frames having a plate shape; forming an anode terminal part by bending one end portion of the anode lead frame to be vertical and forming a cathode terminal part by bending one end portion of the cathode lead frame to be vertical; forming a thin plate electrode to be vertically extended from the cathode terminal part; disposing the anode and cathode lead frames to horizontally face each other; mounting a capacitor body on an upper surface of the thin plate electrode and connecting a tantalum wire of the capacitor body to the anode terminal part of the anode lead frame; and forming a molding part by molding the capacitor body using a resin so that lower surfaces of the anode and cathode lead frames are exposed.

The method may further include, before the disposing of the anode and cathode lead frames to horizontally face each other, forming an insulation layer so that one end portion thereof is supported on the anode lead frame and the other end portion thereof is inserted into and coupled between the cathode lead frame and the thin plate electrode.

The anode terminal part may include a protrusion part formed to be vertically extended therefrom, after the forming of the anode terminal part, and one end portion of the insulation layer may be inserted into and coupled between the anode lead frame and the protrusion part.

The method may further include, before the mounting of the capacitor body, applying a conductive adhesive to an upper surface of the thin plate electrode.

In the applying of the conductive adhesive, the conductive adhesive may include an epoxy-based thermosetting resin and a conductive metal powder.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
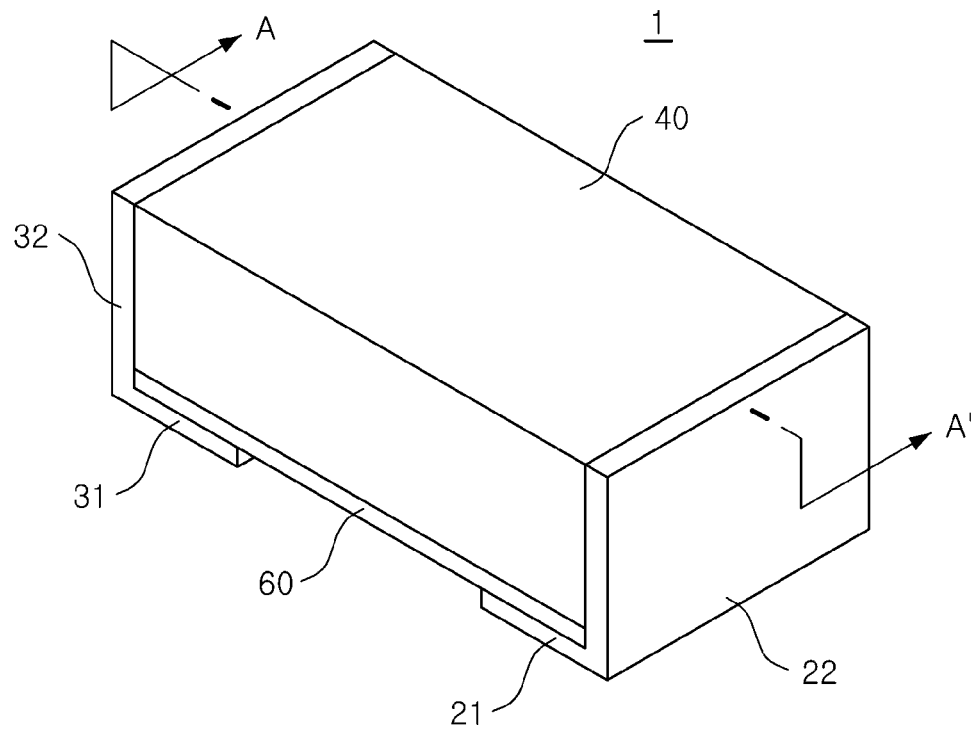
FIG. 1 is a perspective view schematically showing a tantalum capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In addition, for convenience of explanation in the present exemplary embodiment, a description will be made by setting a direction in which a tantalum wire is exposed from a molding part, as a front side and one end surface, setting a direction opposite to the front side, as a rear side and the other end surface, setting a direction vertically crossing the front side and the rear side, as both sides and both side surfaces, and setting a surface corresponding to a thickness direction of the capacitor body, as upper and lower surfaces.

Figure 2:
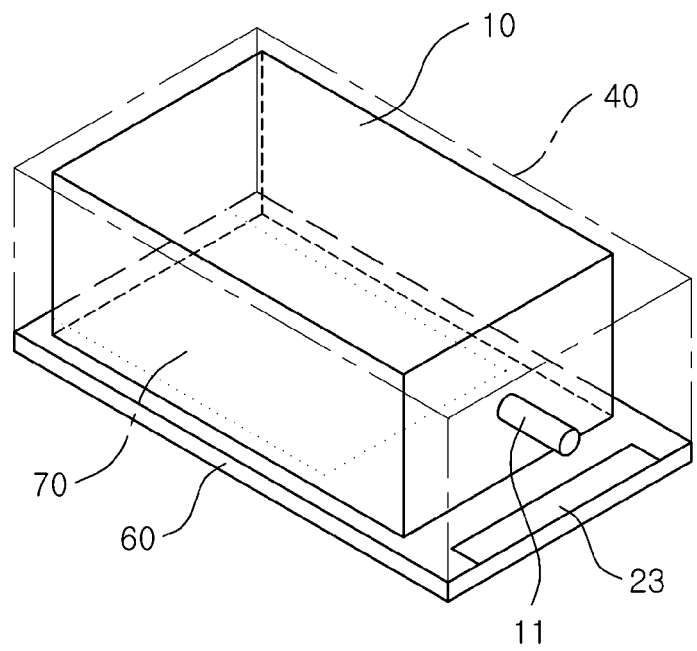
FIG. 2 is a transparent perspective view showing a schematic structure of the tantalum capacitor according to the exemplary embodiment of the present disclosure.
Figure 3:
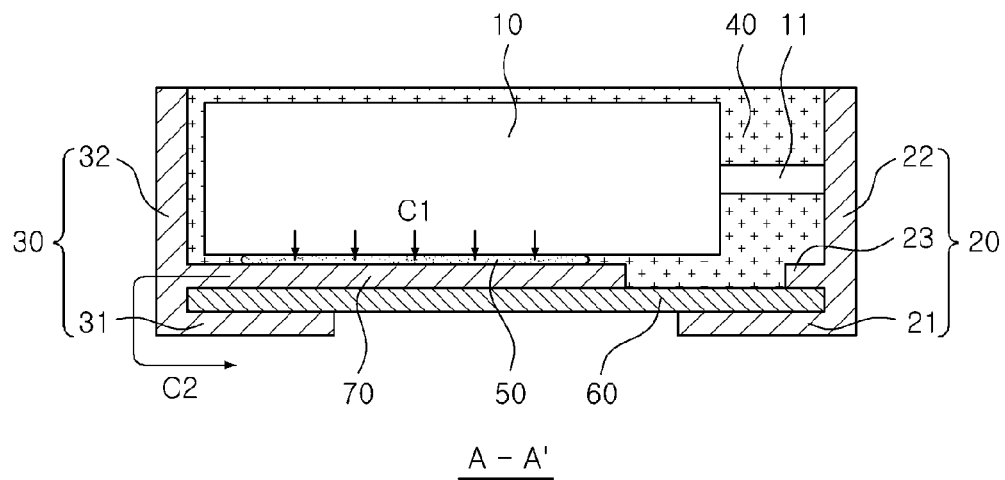
FIG. 3 is a cross-sectional view taken along line A-A' of FIG. 1.

FIG. 1 is a perspective view schematically showing a tantalum capacitor according to an exemplary embodiment of the present disclosure, FIG. 2 is a transparent perspective view showing a schematic structure of the tantalum capacitor according to the exemplary embodiment of the present disclosure, and FIG. 3 is a cross-sectional view taken along line A-A' of FIG. 1.

Referring to FIGS. 1 through 3, a tantalum capacitor 1 according to the present exemplary embodiment may include a capacitor body 10, a molding part 40, an anode lead frame 20, a thin plate electrode 70, and a cathode lead frame 30.

The capacitor body 10 may be formed by using and sintering a tantalum material. In addition, the capacitor body 10 may have a tantalum wire 11 drawn out from a front side thereof.

The above-mentioned capacitor body 10 may be manufactured by mixing and stirring a tantalum powder and a binder at a predetermined ratio, pressing the mixed powder to form a rectangular parallelepiped shape, and then performing sintering thereon under high temperature and high vibration, as an example.

In this case, the tantalum wire 11 may be mounted to be inserted into the mixture of the tantalum powder and the binder so as to be eccentric from the center before pressing the mixed powder.

For example, the capacitor body 10 may be manufactured by inserting the tantalum wire 11 into the tantalum powder mixed with the binder to thereby form a tantalum element having a required size and then sintering the tantalum element under an atmosphere of high vacuum ($10^{-5}$ torr or less) of about 1000 to 2000° C. for about 30 minutes.

In addition, a surface of the capacitor body 10 may be applied with carbon and silver (Ag).

In this case, the carbon is to decrease contact resistance of the surface of the capacitor body 10 and the silver (Ag) is to draw out a cathode described below. The silver, a material having relatively high electrical conductivity, is mainly used to form a conductive layer, but the present disclosure is not limited thereto.

The molding part 40 may be formed by molding a resin so as to enclose the capacitor body 10 in a state in which the end portion of the tantalum wire 11 is exposed to the front side.

The anode lead frame 20 may be formed of a conductive metal and include an anode mounting part 21 and an anode terminal part 22.

The anode mounting part 21 may be attached to a lower surface of the molding part 40 and used as a terminal for an electrical connection to other electronic products.

The anode terminal part 22, a part upwardly bended and extended from the anode mounting part 21, may be attached to one end surface of the molding part 40 and electrically connected to the exposed portion of the tantalum wire 11.

In this case, the anode terminal part 22 maybe attached to the end portion of the tantalum wire 11 by, for example, electrical welding, and the like. Particularly, the electrical welding may be performed using an electrical spot welding method, but the present disclosure is not limited thereto.

In addition, the anode terminal part 22 and one end surface of the molding part 40 may have a conductive adhesive layer (not shown) formed therebetween in order to improve adhesion strength.

The conductive adhesive layer may be formed of a conductive adhesive including an epoxy-based thermosetting resin and a conductive metal powder, but the present disclosure is not limited thereto.

In addition, an example of the conductive metal powder may include silver (Ag), but the present disclosure is not limited thereto.

The thin plate electrode 70 may be formed on the lower surface of the capacitor body 10 and maybe extended to be long so that an end portion thereof is exposed through the other end surface of the molding part 40.

The thin plate electrode 70 may contact the capacitor body 10 and be electrically connected thereto.

The thin plate electrode 70 maybe formed of a conductive metal, and may include, for example, manganese, polymer, and the like, but the present disclosure is not limited thereto.

In this case, the thin plate electrode 70 may have a thickness which may be adjusted to 10 μm or less. This is the reason that in the case in which the thickness of the thin plate electrode 70 exceeds 10 μm, a surface having electrically low resistance may be implemented, but a size of the product may be increased, thereby affecting production and costs of products. However, the present disclosure is not limited thereto.

In addition, as an area of the thin plate electrode 70 corresponding to the lower surface of the capacitor body 10 is increased, an area in which the thin plate electrode 70 and the capacitor body 10 contact each other may be increased. For example, in the case in which the thin plate electrode 70 contacting the lower surface of the capacitor body 10 has the same area as the lower surface of the capacitor body 10, the above-mentioned contact area may be maximized in this case. In the present disclosure, the contact area may be significantly increased by using the thin plate electrode 70 greater than the lower surface of the capacitor body 10.

In general, in the case in which the capacitor body 10 and the thin plate electrode 70 are connected to each other, a contact area ratio may be a required area of 100% regardless of the size of the molding part 40. Therefore, as the molding size is increased, the contact area ratio may be increased.

For example, in a case of a product including the molding part having an area of 16×8 mm, the contact area ratio of the capacitor body and the thin plate electrode is 35.5%, while in a case of a product including the molding part having an area of 32×16 mm, the contact area ratio of the capacitor body and the thin plate electrode is 67.8%, such that the contact area ratio may be increased by two or more times.

For example, in the case in which the cathode lead frame is connected to the capacitor body by the solder through one end surface of the molding part as in the tantalum capacitor according to the related art, a cross-sectional area in which the capacitor body and the cathode lead frame are connected to each other depends on a width-thickness direction and the length thereof may also be 0.1 to 0.25 mm in a vertical direction of the molding part.

On the other hand, in the case in which the electrical connection is performed on the lower surface of the capacitor body using the thin plat electrode as in the present exemplary embodiment, the contact cross-sectional area of the capacitor body and the thin plate electrode may be increased in a width-length direction, and the length thereof may also be significantly decreased to 0.004 mm by the thin plate electrode.

Thereby, an ESR value may be decreased from about 4.1 uΩ to 0.02 uΩ based on a product having 32×16 mm specification. It may be appreciated that as the size of the product is increased, a decreasing ratio of the ESR is also decreased.

Meanwhile, for a the current path, in the tantalum capacitor according to the related art, a current flows in a portion connected to a conductive material such as a silver (Ag) paste in order to connect a cathode surface of the capacitor body and a side of the molding part in a case of a frameless, or a current flows through a portion contacting a lead frame in a case of a structure having the lead frame, but in the present exemplary embodiment, the current flows through the thin plate electrode 70 contacting the lower surface of the capacitor body and also flows through a surface connected to the side of the capacitor body, such that the resistance may be formed in a form such as a parallel connection, thereby additionally decreasing ESR.

In addition, the lower surface, a mounting surface of the capacitor body 10, and the thin plate electrode 70 may have a conductive adhesive layer 50 formed therebetween in order to improve adhesion strength.

The above-mentioned conductive adhesive layer 50 may be formed of a conductive adhesive including an epoxy-based thermosetting resin and a conductive metal powder, but the present disclosure is not limited thereto.

In addition, an example of the conductive metal powder may include silver (Ag), the present disclosure is not limited thereto.

The cathode lead frame 30 may include a cathode mounting part 31 and a cathode terminal part 32.

The cathode mounting part 31 may be attached to the lower surface of the molding part 40 so as to be spaced apart from the anode mounting part 21 and used as a terminal for an electrical connection to other electronic products.

The cathode terminal part 32, a part upwardly bended and extended from the cathode mounting part 31, may be attached to the other end surface of the molding part 40 and electrically connected to the exposed part of the thin plate electrode 70.

As such, since the cathode terminal part 32 is formed to be attached to the other end surface of the molding part 40, volume efficiency of the capacitor body 10 may be improved compared to the capacitor having lead terminals on upper and lower portion of the product according to the related art.

The above-mentioned cathode lead frame 30 may be formed of a conductive metal, and may include, for example, manganese, polymer, and the like, but the present disclosure is not limited thereto.

Meanwhile, an insulation layer 60 may be formed to be interposed between the molding part 40 and the anode mounting part 21 and between the thin plate electrode 70 and the cathode mounting part 31.

The insulation layer 60 may serve to adjust distances between the capacitor body 10 and the anode mounting part 21 and the cathode mounting part 31 used as the external terminals, and may serve to prevent electrical short. Since the capacitor body 10 generally has insulation resistance of $10^9 \Omega$ or more and a dielectric constant of 5.4 or less, the insulation layer 60 may have a thickness of 40 to 50 μm in consideration of this fact, but the present disclosure is not limited thereto.

In this case, the anode lead frame 20 may include a protrusion part 23 backwardly extended to be protruded from the anode terminal part 22 to an inner side of the molding part 40.

Therefore, the protrusion part 23 and the anode mounting part 31 may have a groove part provided therebetween, where one end portion of the insulation layer 60 may be inserted into the groove part to be coupled thereto.

In general, as the volume of the capacitor body is relatively great in the structure of the tantalum capacitor, the capacitance of the capacitor may be increased, but there are limitations in significantly reducing the element size due to an increase in a physical volume.

According to the present exemplary embodiment, the capacitor body 10 is directly connected to the cathode lead frame 30 using the thin plate electrode 70 and uses the significantly reduced current paths C1 and C2, and the contact area between the capacitor body 10 and the cathode lead frame 30 is significantly increased, such that surface resistance may be significantly decreased, thereby decreasing ESR of the tantalum capacitor 1.

In addition, since a solder formed between the capacitor body and the cathode lead frame according to the related art is omitted, the size of the capacitor body 10 may be expanded by an area of the omitted solder, thereby increasing capacitance.

Figure 4:
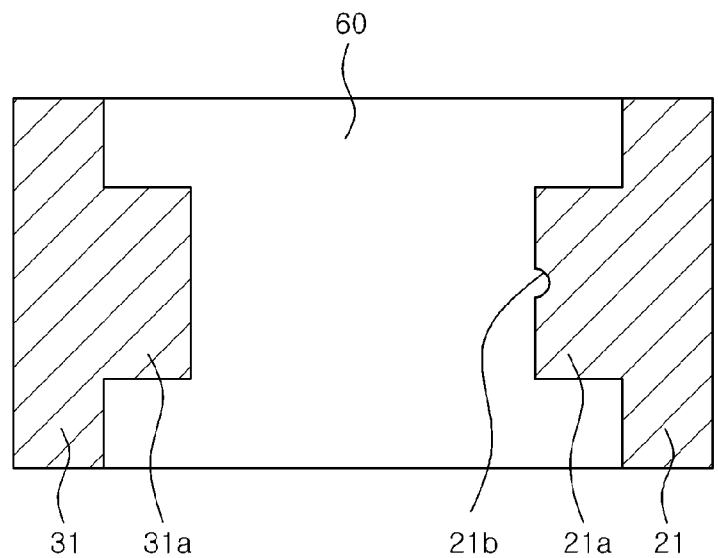
FIG. 4 is a bottom view of FIG. 1.

FIG. 4 is a bottom view of the tantalum capacitor 1 according to the exemplary embodiment of the present disclosure.

Referring to FIG. 4, the anode mounting part 21 and the cathode mounting part 31 may be formed to have steps in an inner side.

The step is generated in a process of performing wetting etching in order to form an electrode on the lower surface of the molding part, and a remaining portion as the insulation layer after an etching process may serve as a terminal.

In addition, the anode mounting part 21 may have a concave groove formed in the step portion in the inner surface thereof. The concave groove may be formed to easily identify (positive and negative) polarities. For example, the groove may be formed in the cathode mounting part 31 rather than the anode mounting part 21.

Hereinafter, a method of manufacturing a tantalum capacitor 1 according to an exemplary embodiment of the present disclosure will be described.

First, anode and cathode lead frames 20 and 30 formed in a plate shape are prepared.

In this case, the anode lead frame 20 may include an anode terminal part 22 formed by bending a front side end portion thereof upwardly to be vertical so as to contact and be electrically connected to the tantalum wire 11. The portion thereof vertically connected to the anode terminal part 22 becomes the anode mounting part 21.

In addition, the cathode lead frame 30 may include a cathode terminal part 32 by bending a rear side end portion thereof upwardly to be vertical. The portion thereof vertically connected to the cathode terminal part 32 becomes the cathode mounting part 31.

In addition, the thin plate electrode 70 is extended to be perpendicular to the cathode terminal part 32.

In this case, the thin plate electrode 70 may face the cathode mounting part 31 so as to be parallel with the cathode mounting part 31.

Meanwhile, the anode and cathode terminal parts 22 and 32 maybe cut so as to have an appropriate length in consideration of the size, and the like of the capacitor body 10.

In this case, the insulation layer 60 may be formed to be supported on the anode and cathode lead frames 20 and 30.

The insulation layer 60 may have one end portion supported on the anode mounting part 21 of the anode lead frame 20 and the other end portion inserted into and coupled between the cathode mounting part 31 of the cathode lead frame 30 and the lower surface of the thin plate electrode 70.

In this case, the anode lead frame 20 may include the protrusion part 23 formed to be extended from the anode terminal part 22 to a rear portion thereof. Therefore, one end portion of the insulation layer 60 is inserted into and coupled between the protrusion part 23 and the anode mounting part 21.

Next, the anode and cathode lead frames 20 and 30 are disposed in parallel with each other so as to horizontally oppose each other.

In this case, the anode and cathode lead frames 20 and 30 may have heat resistant tapes (not shown) attached on the lower surfaces so as to be connected to each other, if necessary. The heat resistant tape is to prevent the surfaces of the anode and cathode lead frames 20 and 30 from being stained in a molding process to be performed later.

Next, the capacitor body 10 is mounted on the upper surface of the thin plate electrode 70.

In addition to this, in a state in which the tantalum wire 11 of the capacitor body 10 is connected to the anode terminal part 22 of the anode lead frame 20, the tantalum wire 11 and the anode terminal part 22 are electrically attached to each other by performing spot welding or laser welding, or applying a conductive adhesive thereto, such that the tantalum wire 11 and the anode lead frame 20 are electrically connected to each other.

In this case, before mounting the capacitor body 10, the conductive adhesive is first applied to the upper surface of the thin plate electrode 70, such that adhesion strength between the capacitor body 10 and the cathode lead frame 30 may be improved.

In order to cure the above-mentioned conductive adhesive layer 50, a process of curing the conductive adhesive layer 50 at a temperature of about 100 to 200° C. may be performed.

The conductive adhesive layer may include an epoxy-based thermosetting resin and a conductive metal powder.

Next, in order to expose the cathode terminal part 32 and the cathode mounting part 31 of the cathode lead frame 30 and the anode terminal part 22 and the anode mounting part 21 of the anode lead frame 20 to the outside, the resin and the like are molded to enclose the tantalum wire 11 and the capacitor body 10 except for the portions exposed to the outside, thereby forming the molding part 40.

The molding part 40 may serve to protect the tantalum wire 11 and the capacitor body 10 from the outside.

When the work of forming the molding part 40 is completed, the heat resistant tapes attached to the lower surfaces of the anode and cathode lead frames 20 and 30 are removed.

As set forth above, according to exemplary embodiments of the present disclosure, the capacitor body is directly connected to the cathode lead frame using the thin plate electrode and uses minimized significantly reduced current path, and the contact area between the capacitor body and the cathode lead frame is significantly increased, such that the ESR of the tantalum capacitor may be decreased.

In addition, since a solder formed between the capacitor body and the cathode lead frame according to the related art is omitted, the size of the capacitor body may be expanded by the area of the omitted solder, thereby increasing capacitance.

While exemplary embodiments have been shown and described above, it will be apparent to those skilled in the art that modifications and variations could be made without departing from the spirit and scope of the present disclosure as defined by the appended claims.

What is claimed is:

1. A tantalum capacitor, comprising:
   a capacitor body including a tantalum powder and having a tantalum wire;
   a molding part formed to expose an end portion of the tantalum wire and enclose the capacitor body;
   an anode lead frame including an anode mounting part formed on a lower surface of the molding part and an anode terminal part formed to be extended from the anode mounting part to one end surface of the molding part, the anode terminal part being connected to the tantalum wire;
   a thin plate electrode formed on a lower surface of the capacitor body and exposed through the other end surface of the molding part; and
   a cathode lead frame including a cathode mounting part formed on the lower surface of the molding part so as to be spaced apart from the anode mounting part and a cathode terminal part formed to be extended from the cathode mounting part to the other end surface of the molding part, the cathode terminal part being connected to the thin plate electrode.

2. The tantalum capacitor of claim 1, further comprising an insulation layer formed between the molding part and the anode mounting part and between the thin plate electrode and the cathode mounting part.

3. The tantalum capacitor of claim 2, wherein the insulation layer has a thickness of 40 μm or less.

4. The tantalum capacitor of claim 2, wherein the anode lead frame has a protrusion part formed to be protruded from the anode terminal part to an inner side of the molding part so that a groove part to which one end portion of the insulation layer is insertedly coupled is provided.

5. The tantalum capacitor of claim 1, further comprising a conductive adhesive layer formed between the lower surface of the capacitor body and the thin plate electrode.

6. The tantalum capacitor of claim 5, wherein the conductive adhesive layer includes an epoxy-based thermosetting resin and a conductive metal powder.

7. A method of manufacturing a tantalum capacitor, the method comprising:
    preparing anode and cathode lead frames having a plate shape;
    forming an anode terminal part by bending one end portion of the anode lead frame to be vertical, and forming a cathode terminal part by bending one end portion of the cathode lead frame to be vertical;
    forming a thin plate electrode to be vertically extended from the cathode terminal part;
    disposing the anode and cathode lead frames to horizontally face each other;
    mounting a capacitor body on an upper surface of the thin plate electrode and connecting a tantalum wire of the capacitor body to the anode terminal part of the anode lead frame; and
    forming a molding part by molding the capacitor body using a resin so that lower surfaces of the anode and cathode lead frames are exposed.

8. The method of claim 7, further comprising, before the disposing of the anode and cathode lead frames to horizontally face each other, forming an insulation layer so that one end portion thereof is supported on the anode lead frame and the other end portion thereof is inserted into and coupled between the cathode lead frame and the thin plate electrode.

9. The method of claim 8, wherein the anode terminal part includes a protrusion part formed to be vertically extended therefrom, after the forming of the anode terminal part, and one end portion of the insulation layer is inserted into and coupled between the anode lead frame and the protrusion part.

10. The method of claim 7, further comprising, before the mounting of the capacitor body, applying a conductive adhesive to an upper surface of the thin plate electrode.

11. The method of claim 10, wherein in the applying of the conductive adhesive, the conductive adhesive includes an epoxy-based thermosetting resin and a conductive metal powder.

* * * * *